| United States Patent [19] | [11] Patent Number: 4,737,179 |
| Tanaka et al. | [45] Date of Patent: Apr. 12, 1988 |

[54] METHOD FOR PRODUCING GLASS PREFORM FOR OPTICAL FIBER

[75] Inventors: Gotaro Tanaka; Hiroshi Yokota; Shigeru Tanaka; Hiroo Kanamori; Hiroshi Suganuma, all of Yokohama, Japan

[73] Assignee: Sumitomo Electric Industries, Ltd., Osaka, Japan

[21] Appl. No.: 893,084

[22] Filed: Aug. 4, 1986

[30] Foreign Application Priority Data

Aug. 14, 1985 [JP] Japan .................. 60-1777714

[51] Int. Cl.$^4$ ............................. C03B 37/018
[52] U.S. Cl. ............................. 65/3.12; 65/13
[58] Field of Search ............... 65/1, 2, 3.11, 3.12, 65/13

[56] References Cited

U.S. PATENT DOCUMENTS 4,123,483 10/1978 Nakahara et al. ............... 65/3.12 X
4,610,709 9/1986 Kawauchi et al. .................. 65/3.12

FOREIGN PATENT DOCUMENTS 54-131043 10/1979 Japan ........................................ 65/2
55-16980 5/1980 Japan ................................... 65/3.12
57-175743 10/1982 Japan ............................. 65/DIG. 16
60-108334 6/1985 Japan ................................... 65/3.11

*Primary Examiner*—Robert L. Lindsay
*Attorney, Agent, or Firm*—Cushman, Darby & Cushman

[57] ABSTRACT

A method for producing a glass preform for use in fabrication of an optical fiber, which comprises steps of forming a cylindrical rod of glass having a refractive index distribution with axial symmetry around the rod axis by an VAD method, stretching the rod glass to decrease its diameter, inserting the stretched rod in a glass tube having a refractive index distribution with axial symmetry around the tube axis and heating and melting a complex of the stretched rod and the tube to integrate them from the glass preform produced by the method, an optical fiber having precisely controlled refractive index distribution can be fabricated.

4 Claims, 2 Drawing Sheets

METHOD FOR PRODUCING GLASS PREFORM FOR OPTICAL FIBER

BACKGROUND OF THE INVENTION

1. Field of the Invention

The present invention relates to a method for producing a glass preform for use in fabrication of an optical fiber. More particularly, it relates to a method for producing a glass preform for use in fabrication of an optical fiber, particularly a single mode optical fiber having a zero dispersion wavelength at least in a wavelength band of 1.5 μm.

2. Description of Prior Arts

An optical fiber made of quartz base glass has a minimum attenuation of light transmission in a wavelength range between 1.5 μm and 1.6 μm. In order to minimize the interval between two junctions in an optical fiber transmission system, light in a wavelength band of 1.5 μm should be used. In this case, a single mode optical fiber is used rather than a multi-mode optical fiber to transmit information at a high transmission rate since the former has much wider transmission band than the latter. For transmitting information at a very high transmission rate, it is necessary to minimize an optical dispersion effect at the wavelength of light to be transmitted.

A currently used single mode optical fiber for a wavelength of 1.3 μm is designed so that material dispersion and structural dispersion offset each other to make an optical dispersion sum zero.

In order to use the single mode optical fiber in the 1.5 micron wavelength band and minimize the optical dispersion in this wavelength band, there are two methods, one of which is to design a structure of an optical fiber so that the optical dispersion is zero in this wavelength band and the other of which is to use a light source having a very narrow spectral band width at a wavelength used in this wavelength band.

The present invention intends to minimize the optical dispersion in the 1.5 micron wavelength band by designing a structure of an optical fiber so that the optical dispersion is zero at least in this wavelength band.

A typical refractive index distribution of an optical fiber having such structure is shown in FIG. 1A, 1B or 1C. An optical fiber having the refractive index distribution of FIG. 1A or 1B has a low optical dispersion level in the 1.5 micron wavelength band and a wavelength band wider than it. In these cases, the optical fiber can be used at other wavelength and, further, it is advantageously used for wavelength multiplex transmission.

For the production of an optical fiber having the refractive index distribution of FIG. 1A, 1B or 1C, available are a modified chemical vapor deposition (MCVD) method and an outside vapor deposition (OVD) method. In these methods, layers of glass soot having different refractive indices are deposited in a radial direction on an inner or outer surface of a starting glass tube to provide a desired refractive index distribution and collapsing a tube-like glass preform into a rod-like glass preform.

An optical fiber having relatively good performance can be fabricated from the glass preform produced by the conventional methods. However, it is very difficult to precisely control the refractive index distribution since the domain in which the refractive index should be varied is a central portion of the fiber of about 10 μm in diameter, which is much smaller than an outer diameter of the usual optical fiber of about 125 μm. Furthermore, since an additive for adjusting the refractive index of glass, namely a dopant, tends to evaporate during collapsing the tube-like preform into the cylindrical rod in the conventional methods, the refractive index distribution in the central portion of the optical fiber is disadvantageously fluctuated.

By a conventional vapor phase axial deposition (VAD) method, it is rather difficult to produce a glass preform having plural maximum and minimum points in the refractive index distribution as shown in FIG. 1A, 1B or 1C.

SUMMARY OF THE INVENTION

One object of the present invention is to provide a method for producing a glass preform for use in fabrication of an optical fiber having a refractive index distribution such as shown in FIG. 1A, 1B or 1C.

Another object of the present invention is to provide a method for producing a glass preform for use in fabrication of a single mode optical fiber having zero optical dispersion at a wavelength band of 1.5 μm.

Further object of the present invention is to provide a method for producing a glass preform for use in fabrication of an optical fiber which has a controlled refractive index distribution.

These and other objects are achieved by a method for producing a glass preform for use in fabrication of an optical fiber according to the present invention, which comprises steps of forming a cylindrical rod of glass having a refractive index distribution with axial symmetry around the rod axis by an VAD method, stretching the rod glass to reduce its diameter, inserting the stretched rod in a glass tube having a refractive index distribution with axial symmetry around the tube axis and heating and melting a complex of the stretched rod and the tube to integrate them.

DETAILED DESCRIPTION OF THE INVENTION

According to the present invention, a glass tube is formed to have a refractive index distribution with axial distribution around the tube axis.

Figure 1A:
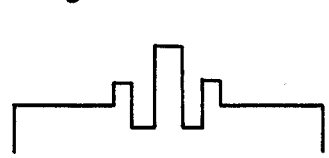
FIGS. 1A, 1B and 1C show typical refractive index distributions in a radial direction of single mode optical fibers.
Figure 1B:
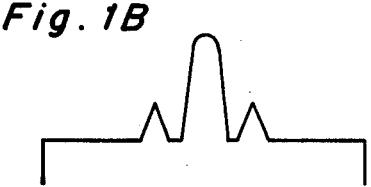
Figure 1C:
Figure 2A:
FIGS. 2A and 2B show refractive index distributions of a glass rod produced in Example 1, Sample No. 1 and a bored glass rod produced therefrom, FIG. 3 schematically shows a VAD method using two burners.
Figure 2B:

The glass tube may be produced by the conventional MCVD or OVD method. Alternatively, the tube is preferably produced by forming a glass rod having a refractive index distribution as shown in FIG. 2A by the VAD method and boring its central portion by a conventional method (e.g., ultrasonic boring, mechanical drilling, chemical etching and the like) to form a glass tube having a refractive index distribution as shown in FIG. 2B. For adjusting the refractive index of the glass, an additive such as $GeO_2$ and fluorine can be used.

In a separate step, there is produced a glass rod having a refractive index distribution with axial symmetry around the rod axis by the VAD method, so that the refractive indexes corresponds to those of a core and a first cladding of the optical fiber. Then, the glass rod is stretched to decrease its diameter so that it can be inserted in the glass tube previously produced. The stretched rod is inserted in the glass tube and the composite is heated and melted to integrate them, thereby a glass preform is obtained.

Figure 3:
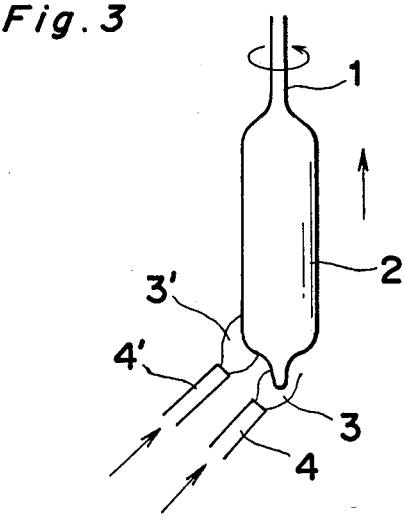

A typical VAD method is schematically shown in FIG. 3. A raw material for forming glass is introduced in a oxyhydrogen or plasma flame 3, 3' to synthesize glass soot. The glass soot is deposited on a starting rod 1 which is rotated in the direction indicated by the arrow and moved upwardly to make a porous glass rod. The porous glass rod is then sintered and vitrified. Two burners 4, 4' are used in FIG. 6, although a single burner may be used. The VAD method can be carried out according to the conventional manner.

Examples of the raw material for forming glass are $SiCl_4$, $GeCl_4$, $SiHCl_3$, $BCl_3$ and the like.

The integration of the glass tube and the glass rod inserted therein is carried out by heating them at a temperature higher than the melting point of the glass preferably in an atmosphere of an inert gas (e.g. helium, argon and the like) optionally containing chlorine and/or oxygen under pressure of about 1 atm.

During integration, an etchant and/or a dehydrating agent are preferably supplied between the tube and the rod to produce a clean interface between them. Examples of the etchant are a combination of oxygen with $SF_6$, $SiF_4$, $CCl_2F_2$ or $CF_4$ and the like. Examples of the dehydrating agent are $Cl_2$, $SOCl_2$, $CCl_2F_2$, $CF_4$, $SF_6$, etc.

Practically and presently preferred embodiments of the present invention will be illustrated by the following examples.

EXAMPLE 1

Figure 6:
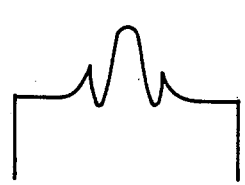
FIG. 6 shows a refractive index distribution in a radial direction of an integrated tube-rod composite produced in Example 2.

From a mixture of $SiCl_4$, $GeCl_4$, Ar, $O_2$ and $H_2$, a porous glass preform was synthesized by the VAD method as illustrated in FIG. 6 using two burners and sintered to obtain a transparent glass rod having a refractive index distribution in a radial direction as shown in FIG. 2A, and sizes and properties as shown in Table 1 (Sample No. 1). The central portion of the rod was bored by means of an ultrasonic boring machine to form a tube of 6 mm in inner diameter. The inner wall of the tube was washed with a HF solution and subjected to gaseous phase etching by heating it at 1,400° C. with supplying $SF_6$ at a rate of 200 ml/min. into the bore. The glass tube had a refractive index distribution in a radial direction as shown in FIG. 2B.

Figure 4:
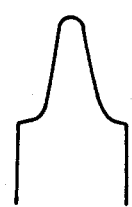
FIG. 4 shows a refractive index distribution in a radial direction of a glass rod produced in Example 1, Sample No. 2.

In the same VAD method as above, a glass rod was produced, which had a refractive index distribution as shown in FIG. 4, and sizes and properties as shown in Table 1 (Sample No. 2).

Figure 5:
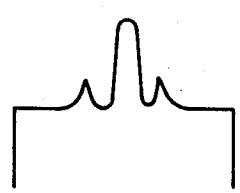
FIG. 5 shows a refractive index distribution in a radial direction of an integrated tube-rod composite produced in Example 1.

This glass rod was heated by means of a resistance heater kept at 2,000° C. and stretched to decrease its outer diameter to 6 mm. Then the stretched rod was inserted in the previously produced tube. The complex of the tube and rod was integrated by heating it from the outside with supplying a gaseous etchant ($SF_6 + O_2$) and a dehydrating agent ($SOCl_2$) to clean the inner surface of the tube and the outer surface of the rod. The produced glass rod had a refractive index distribution in its radial direction as shown in FIG. 5.

Thereafter, the glass rod was heated and stretched followed by jacketing with a quartz tube to form a glass preform, which was drawn to fabricated a single mode optical fiber.

Characteristics of the fabricated optical fiber were as follows:

Spot size: 10 $\mu$m
Cut off wavelength: 1.20 $\mu$m
Zero dispersion wavelength: 1.548 $\mu$m
Attenuation at wavelength of 1.55 $\mu$m: 0.25 dB/km.

EXAMPLE 2

By the same VAD method as in Example 1, a glass rod having a core composition of $GeO_2$-$SiO_2$ and a cladding composition of $SiO_2$ and heated in a sintering furnace at 1,500° C. with supplying $CF_4$ at a rate of 200 ml/min. and helium at a rate of 10 l/min. to produce a glass rod having sizes and properties as shown in Table 1 (Sample No. 3). It was then bored to form a glass tube.

From the resulting glass tube and a glass rod produced in the same manner as in Example 1, a composite glass rod was produced and jacketed with a quartz tube to form a glass preform in the same manner as in Example 1. A refractive index distribution of the glass rod is shown in FIG. 6.

Characteristics of an optical fiber fabricated from this glass preform are as follows:

Spot size: 10 $\mu$m
Cut off wavelength: 1.20 $\mu$m
Zero dispersion wavelength: 1.545 $\mu$m
Attenuation at wavelength of 1.55 $\mu$m: 0.23 dB/km

EXAMPLE 3

Figure 7:
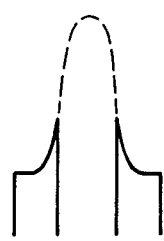
FIG. 7 shows a refractive index distribution in a radial direction of a glass tube produced from a glass rod produced in Example 3, Sample No. 4.

By the same VAD method as in Example 1, a glass rod having a core composition of $GeO_2$-$SiO_2$ and a cladding composition of $SiO_2$ and heated in a sintering furnace kept at 1,500° C. with supplying $SiF_4$ at a rate of 150 ml/min. to produce a glass rod having sizes and properties as shown in Table 1 (Sample No. 4). It was then bored by means of an ultrasonic boring machine to form a glass tube of 15 mm in inner diameter. The inner wall of the tube was washed with a HF solution and subjected to gaseous phase etching by supplying $SF_6$ at a rate of 200 ml/min. followed by stretching to an outer diameter of 16 mm. A refractive index distribution of this tube in a radial direction is shown in FIG. 7.

Figure 8:
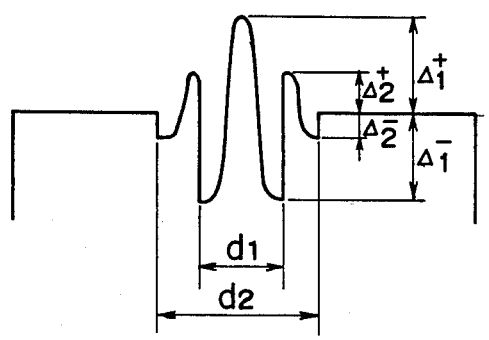
FIG. 8 shows a refractive index distribution in a radial direction of an optical fiber fabricated in Example 3.

In the same manner as above but changing the core/cladding ratio and a supply rate of $SiF_4$ during sintering, a glass rod having sizes and properties as shown in Table 1 (Sample No. 5) was produced. The rod was stretched to an outer diameter of 7 mm and inserted in the previously produced glass tube. The composite was integrated in the same manner as in Example 1 followed by jacketing with a quartz tube to make a glass preform. The preform was drawn to fabricate a single mode optical fiber, which had a refractive index distribution shown in FIG. 8 and properties shown in Table 2. In this fiber, zero dispersion wavelengths were 1.32 and 1.58 μm and dispersion value in a range between these two wavelengths was 5 ps/km.nm.

TABLE 1

| Sample No. | Outer diameter of glass rod (cladding outer diameter) | Outer diameter of core | Specific difference of refractive index (core/cladding) | Composition of core | Composition of cladding |
|---|---|---|---|---|---|
| 1 | 40 mm | 8 mm | 0.4% | $GeO_2$—$SiO_2$ | $SiO_2$ |
| 2 | 36 mm | 21 mm | 0.9% | $GeO_2$—$SiO_2$ | $SiO_2$ |
| 3 | 36 mm | 21 mm | 0.9% | $GeO_2$—F—$SiO_2$ | F—$SiO_2$[*1] |
| 4 | 32 mm | 28 mm | 0.9% | $GeO_2$—F—$SiO_2$ | F—$SiO_2$[*2] |
| 5 | 32 mm | 16 mm | 0.9% | $GeO_2$—F—$SiO_2$ | F—$SiO_2$[*3] |

Note
[*1] Specific difference of refractive index to pure $SiO_2$ was 0.2%.
[*2] Specific difference of refractive index to pure $SiO_2$ was 0.15%.
[*3] Specific difference of refractive index to pure $SiO_2$ was 0.45%.

TABLE 2

| $d_1$ | $d_2$ | $\Delta_2^+$ | $\Delta_1^-$ | $\Delta_2^+$ | $\Delta_2^-$ |
|---|---|---|---|---|---|
| 8 μm | 32 μm | 0.45% | −0.45% | 0.2% | 0.15% |

According to the present invention, since the central portion of the glass preform which corresponds to a core portion of the optical fiber is produced by the VAD method, the refractive index distribution of the core is not affected by evaporation in the collapsing step and is not fluctuated. Since the glass rod having the desired refractive index distribution is stretched to the rod with a smaller diameter, the refractive index distribution within a very small portion of the core of the single optical fiber follows the distribution in the unstretched glass rod produced by the VAD method so that it can be precisely controlled. Therefore, an optical fiber having a complicated refractive index distribution such as having plural maximum and/or minimum points can be easily produced in the small number of simple steps.

What is claimed is:

1. A method for producing a glass preform for use in fabrication of an optical fiber, which comprises steps of:
   forming, by a VAD method, a cylindrical rod of glass having a refractive index distribution with axial symmetry around the rod axis such that the refractive indices correspond to a core and a first cladding portion of an optical fiber,
   stretching the rod glass to decrease its diameter,
   inserting the stretched rod in a glass tube having a refractive index distribution with axial symmetry around the tube axis such that the refractive index of an inner layer of the tube is larger than that of the first cladding portion of the stretched rod and heating and melting a complex of the stretched rod and the tube to integrate them.

2. The method according to claim 1, wherein the tube has been produced by forming a cylindrical rod of glass having a refractive index distribution with axial symmetry around the rod axis and boring the central portion of the rod.

3. The method according to claim 1, wherein the tube has been produced by a MCVD method or a OVD method.

4. A method for producing a glass preform for use in fabrication of an optical fiber, which comprises steps of:
   forming by a VAD method, a cylindrical rod of glass having a refractive index distribution with axial symmetry around the rod axis such that the refractive indices correspond to a core and a first cladding portion of an optical fiber,
   stretching the rod glass to decrease its diameter,
   inserting the stretched rod in a glass tube having a refractive index distribution with axial symmetry around the tube axis such that the refractive index of an inner layer of the tube is larger than that of the first cladding portion of the stretched rod and heating and melting a complex of the stretched rod and the tube to integrate them,
   wherein the integration step is carried out with supplying an etchant and/or a dehydrating agent between the tube and the rod.

* * * * *